United States Patent [19]

Johnson et al.

[11] 4,140,875
[45] Feb. 20, 1979

[54] FOUR-WIRE, EIGHT-LEG BRIDGE

[75] Inventors: Bill E. Johnson; John E. Dannenmann, Jr., both of Portland, Oreg.

[73] Assignee: Bejed, Inc., Portland, Oreg.

[21] Appl. No.: 890,387

[22] Filed: Mar. 27, 1978

[51] Int. Cl.² .................. H04B 1/58; H04M 3/56
[52] U.S. Cl. ................................ 179/1 CN; 333/6
[58] Field of Search ............... 179/1 CN; 333/1, 6, 333/11

[56]  References Cited
U.S. PATENT DOCUMENTS
2,182,192  12/1939  Becker ................................ 333/6

FOREIGN PATENT DOCUMENTS
1353367  5/1974  United Kingdom ............ 179/1 CN

*Primary Examiner*—Kathleen H. Claffy
*Assistant Examiner*—E. S. Kemeny

[57]  ABSTRACT

A 4-wire, 8-leg resistance bridge for interconnecting up to eight stations in a full conference system includes a two line input port and an associated two line output port for each of eight 4-wire telecommunication transmission lines. By providing a certain pattern of straight and rollover (reverse) connections between various pairs of the lines in the bridge, an essentially infinite return loss between the input and output ports of each leg is achieved. In addition, the bridge has a uniform natural loss between each leg's input port and the output ports of the other legs, and provides the proper terminating impedance for each of the interconnected transmission lines.

5 Claims, 3 Drawing Figures

FOUR-WIRE, EIGHT-LEG BRIDGE

BACKGROUND AND OBJECTS OF THE INVENTION

The present invention relates generally to telecommunication systems, and more particularly to a resistance bridge for interconnecting multiple stations in a 4-wire full conference system.

The stations or terminals in most low frequency telecommunication systems, including most public telephone systems, are interconnected by 2-wire transmission lines. If full duplex operation is desired (as in a telephone system, for example), a hybrid transformer or other suitable means must be provided at each station to enable the single pair of wires simultaneously to carry messages traveling in opposite directions. A certain amount of cross-coupling does occur, but usually it can be held within acceptable limits by balancing the line carefully and avoiding excessive signal levels. When maximum separation between incoming and outgoing signals is required, however, 4-wire transmission lines are used to join the stations in a system.

A 4-wire transmission line consists of two associated pairs of wires. One pair carries information in one direction between two interconnected stations; the other pair carries information in the opposite direction. Such lines are commonly used in multistation private line networks, for example, and in other applications where maximum separation is needed for circuit stability.

The transmission lines in a 4-wire telecommunication system normally are interconnected by means of a 4-wire bridge having an input (receive) and an output (transmit) port for each line. Such bridges, which take the form of passive resistance networks, ideally have an infinite return loss (i.e., zero energy transfer) between the input and output ports of the same line. In addition, an "ideal" bridge has a uniform natural loss between each line's input port and the other lines' output ports, and provides the proper terminating impedance for each of the interconnected transmission lines. Thus, in an ideal bridge signals received at any line's input port will appear (in equally attenuated form) at the output ports of all the other lines, but will be absent at that line's own output port.

Four-wire resistance bridges of the type being considered typically are constructed using discrete resistors, the number required being equal to $2(N^2-N)$, where N is the number of lines the bridge is designed to accomodate. Thus, a 4-wire, 3-line (or 3-leg) bridge includes 12 resistors, all of the same value. A schematic diagram for such a bridge is shown in FIG. 2. It will be noted that there is no direct connection between the input and output terminals of the same leg, or line, but that there are multiple secondary paths between them. For example, input terminal RT1 is not connected directly to output terminal TT1, but the two terminals are joined by a secondary path that includes resistors R2, R6 and R5. Another, more remote secondary path between the same terminals includes resistors R1, R12, R11, R7, R8, R4, R3, R10 and R9. To prevent signals received at the input port of a line from being returned to the sender via that line's output port, the bridge must be wired so as to cancel the energy in these secondary paths. This is accomplished by incorporating "rollovers" in certain of the primary paths, the remaining paths being wired "straight." A straight connection is one in which the Receive Tip (RT) and Receive Ring (RR) terminals of one line are connected directly to the Transmit Tip (TT) and Transmit Ring (TR) terminals, respectively, of a different line. In a rollover connection, the RT and RR terminal of a line are cross-connected to the TR and TT terminals, respectively, of a different line. The FIG. 2 bridge includes five straight connections and one roll-over (between line 1 and line 2).

The number of straight-rollover connection combinations in a 4-wire bridge is equal to $2^{N(N-1)}$. Thus, the number of possible combinations increases from 32 for a 3-leg bridge to approximately $7.2 \times 10^{16}$ for an 8-leg bridge. For that reason, it has not been considered possible, as a practical matter, to construct an ideal 4-wire, 8-leg bridge, even though correct straight-rollover patterns have been discovered for 3-, 4- and 6-leg bridges. When more than six lines are needed for a telecommunication circuit, standard practice has been to use combinations of 4-leg and 6-leg bridges tied together with amplifiers. A nominal 600 ohm impedance (the standard value for 4-wire telecommunication lines) 4-leg bridge has a natural line-to-line loss of about 14.7 dBm, and a 6-leg bridge has a natural loss of about 19.5 dBm. On standard toll lines, signals are received at +7 dBm and sent out at −16 dBm, a total of 23 dBm loss from input to output. Accordingly, it is necessary to provide additional padding (loss) to match standard toll levels when 4- and 6-leg bridges are used. It can be shown, however, that a 600 ohm 8-leg bridge has a natural loss of about 22.6 dBm. Since 0.5 dBm loss is normally allowed for intra-office cabling, no additional padding is required with a 4-wire, 8-leg bridge. In view of the above, the primary object of the present invention is to provide an ideal 4-wire, 8-leg bridge suitable for interconnecting multiple stations in a 4-wire full conference system.

A more specific object of the invention is to provide a 4-wire, 8-leg resistance bridge having a pattern of straight and rollover connections between the various legs that provides an infinite return loss between the input and output terminals of the same leg, together with a uniform natural loss between the input and output terminals of different legs.

The full, lawful scope of the present invention is set forth with particularity in the appended claims. However, the various objects, features and advantages of the invention will be best understood and appreciated by reference to the following description of the preferred embodiment read in conjunction with the accompanying drawing.

DETAILED DESCRIPTION

Figure 1:
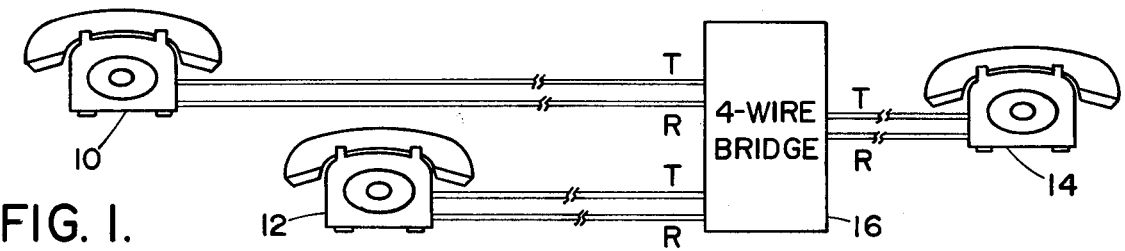
FIG. 1 is a simplified block diagram of a 4-wire telecommunication system.

Referring to the drawing, and first of all to FIG. 1 thereof, a simplified private line telephone network is shown to include three stations 10, 12, 14 interconnected via 4-wire transmission lines and a 3-leg bridge 16. Each transmission line includes a "transmit" pair of wires for sending information from a station to bridge 16, and a separate pair of "receive" wires for transferring information from the bridge to that station. This assures maximum separation between the outgoing and incoming signals, assuming that bridge 16 provides essentially no cross-coupling between a line's transmit and receive pairs. With only three stations in the network, bridge 16 may be a prior art 4-wire, 3-leg bridge such as that shown in FIG. 2.

Figure 2:
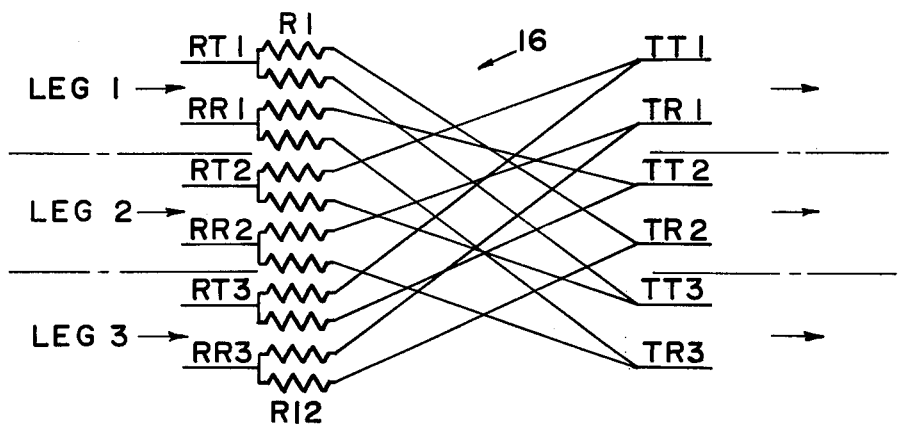
FIG. 2 is a schematic diagram of a prior art 4-wire, 3-leg resistance bridge.

Referring now to FIG. 2, bridge 16 includes a pair of input, or receive, terminals RT and RR, and a pair of output, or transmit, terminals TT and TR for each line. Each input terminal is connected by a pair of resistors to the output terminals of the other two lines, as shown. Twelve resistors R1-R12 are used in the 3-leg bridge. All have the same value, which is chosen to provide the proper terminating impedance for the transmission lines. As already mentioned, the standard impedance for 4-wire telecommunication lines is 600 ohms. To match that impedance, resistors R1-R12 suitably have a value of 400 ohms. One rollover is incorporated in bridge 16, between the input terminals of line 1 and the output terminals of line 2. All of the other bridge connections are straight. It should be noted that the same electrical properties would result if all of the connections were reversed, i.e. if the straight connections were changed to rollovers and the single rollover was changed to a straight connection. The same is true of any ideal 4-wire bridge.

The natural loss of a 600 ohm 4-wire, 3-leg bridge is about 9.5 dBm. Allowing 0.5 dBm for cabling losses, an additional 13 dBm of padding (not shown) is required at the output terminals of the bridge to adjust the total throughput attenuation to the standard 23 dBm level. This, of course, is a significant drawback because of the added equipment and record keeping that are required for telephone companies providing the service.

It has been known that a 600 ohm 4-wire, 8-leg bridge would not require additional padding, since it can be shown mathematically that such a bridge would have a natural loss of about 22.6 dBm. Until now, however, a pattern or arrangement of straight and rollover connections that would produce an ideal 8-leg bridge has not been discovered. Without such an arrangement, maximum return loss between the input and output terminals of the same line cannot be achieved.

Figure 3:
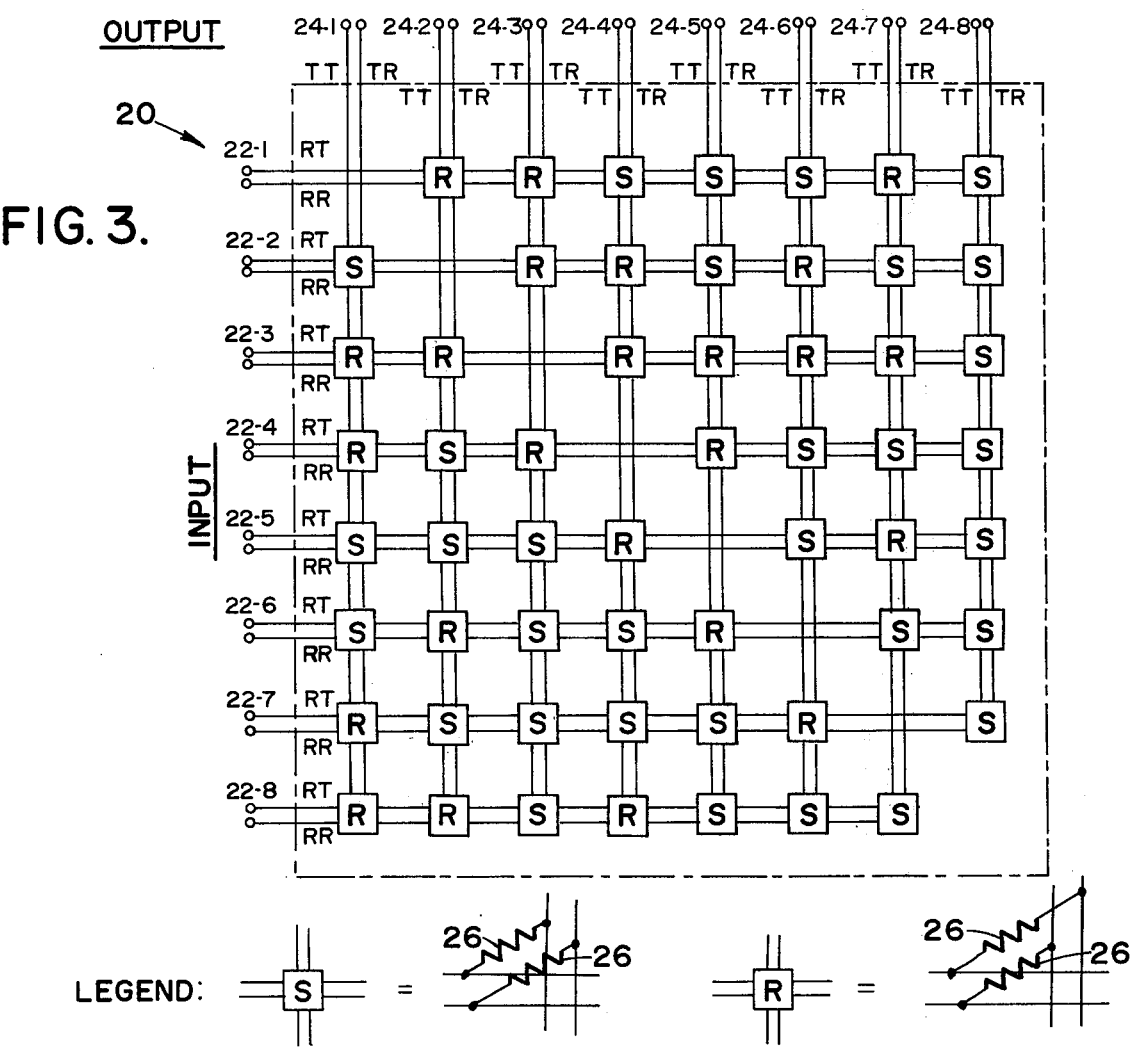
FIG. 3 is a functional block diagram, together with an explanatory legend, of a 4-wire, 8-leg bridge according to the present invention.

The connection pattern for an ideal 4-wire, 8-leg resistance bridge 20 is shown in FIG. 3 in semischematic form. Bridge 20 includes eight input ports 22-1 through 22-8, each comprising a tip conductor (RT) and a ring conductor (RR). Associated with each input port is an output port 24-1 through 24-8, each also including tip and ring conductors (TT and TR, respectively). As will thus be evident, bridge 20 includes a separate input and output port for each of eight 4-wire transmission lines. No direct connection is provided in the bridge between the input and output ports for the same line. However, each input port 22 is joined by resistors 26 to the output ports for each of the other lines. As in the case of the simpler 3-leg bridge shown in FIG. 2, certain of these connections are straight (S) and certain are rollovers (R), with the pattern or arrangement being chosen to produce essentially complete cancellation of energy traveling in secondary paths between each line's input and output ports. Referring to the FIG. 3 legend, a straight connection is shown to be one in which the input and output port conductors are connected tip-to-tip and ring-to-ring via a pair of resistors 26. Conversely a rollover connection is one in which the conductors are connected tip-to-ring and ring-to-tip.

Bridge 20 includes 112 resistors 26, all of the same value. That value is chosen to provide the desired transmission line termination impedance. For use in conjunction with 600 ohm transmission lines, the resistors in bridge 20 suitably have a calculated value of 1938.5 ohms. For practical purposes, standard 1% tolerance resistors having a nominal value of 1960 ohms are satisfactory.

The pattern, or system, of straight and roll-over port interconnections shown in FIG. 3 has been found to produce a bridge having the characteristics of an ideal bridge, as outlined above. Of the 56 input-to-output port interconnections, 32 are straight and 24 are rollovers. It should be understood that an electrically identical bridge can be produced by reversing each interconnection, i.e., changing each straight connection to a rollover, and vice versa. Likewise, the input ports can be redesignated as output ports, and vice versa, without any change in the bridge's performance.

Fewer than eight 4-wire transmission lines may be interconnected using bridge 20, provided the unused ports are terminated by 600 ohm resistors.

A 4-wire, 8-leg resistance bridge that fulfills the objectives set forth above has thus been disclosed. While the best mode presently contemplated for practicing the invention has been described in detail, it will be appreciated that various changes and modifications other than those specifically mentioned are possible. The true scope of the invention is therefore to be determined solely by reference to the following claims.

We claim:

1. A 4-wire, 8-leg resistance bridge for interconnecting a plurality of 4-wire telecommunication transmission lines, said bridge comprising
   first, second, third, fourth, fifth, sixth, seventh, and eighth legs, each including a two conductor input port and an associated two conductor output port,
   a plurality of resistors connecting each leg's input port conductors to each other leg's output port conductors, all of said resistors being of substantially the same value,
   a first portion of the connections being of a straight type in which the input port conductors are connected by individual resistors to corresponding output port conductors,
   the remaining portion of the connections being of a reversed type in which the input port conductors are connected by individual resistors to the opposite output port conductors,
   said bridge having an arrangement of straight and reversed connections that provides substantially complete cancellation of signal energy traveling in secondary paths within the bridge between each leg's input and output ports.

2. The bridge of claim 1, wherein 32 connections are of one type and 24 connections are of the other type.

3. The bridge of claim 1, wherein said resistors have a value in the range of about 1900 to about 2000 ohms.

4. The bridge of claim 1, wherein
   the connections between said first leg's input port conductors and the output port conductors of said second, third and seventh legs are of the same type,
   the connections between said second leg's input port conductors and the output port conductors of said third, fourth and sixth legs are of the same type,
   the connections between said third leg's input port conductors and the output port conductors of said first, second, fourth, fifth, sixth and seventh legs are of the same type, the connections between said fourth leg's input port conductors and the output port conductors of said first, third and fifth legs are of the same type, the connections between said fifth leg's input port conductors and the output port conductors of said fourth and seventh legs are of the same type, the connections between said sixth leg's input port conductors and the output port conductors of said second and fifth legs are of the same type, the connections between said seventh leg's input port conductors and the output port conductors of said first and sixth legs are of the same type, the connections between said eighth leg's input port conductors and the output port conductors of said first, second and fourth legs are of the same type, and the remaining connections in said bridge are of the other type.

5. The bridge of claim 4, wherein said same type is a reversed connection.